United States Patent
Arunasalam et al.

(10) Patent No.: US 9,618,140 B2
(45) Date of Patent: Apr. 11, 2017

(54) MICROVALVE HAVING IMPROVED ACTUATOR

(71) Applicant: DunAn Microstaq, Inc., Austin, TX (US)

(72) Inventors: Parthiban Arunasalam, Austin, TX (US); E. Nelson Fuller, Manchester, MI (US); Joe A. Ojeda, Sr., Austin, TX (US); Gengxun K. Gurley, Hutto, TX (US); Chen Yang, Austin, TX (US)

(73) Assignee: DunAn Microstaq, Inc., Austin, TX (US)

( * ) Notice: Subject to any disclaimer, the term of this patent is extended or adjusted under 35 U.S.C. 154(b) by 112 days.

(21) Appl. No.: 14/805,500

(22) Filed: Jul. 22, 2015

(65) Prior Publication Data
US 2016/0138733 A1    May 19, 2016

Related U.S. Application Data

(66) Substitute for application No. 62/079,892, filed on Nov. 14, 2014.

(51) Int. Cl.
*F16K 99/00*    (2006.01)

(52) U.S. Cl.
CPC ...... *F16K 99/0044* (2013.01); *F16K 99/0011* (2013.01); *F16K 99/0028* (2013.01)

(58) Field of Classification Search
CPC ............ F16K 99/0011; F16K 99/0028; F16K 99/0042–99/0053; B81B 2201/054
USPC .............................................. 251/11, 129.01
See application file for complete search history.

(56) References Cited

U.S. PATENT DOCUMENTS

| | | | | |
|---|---|---|---|---|
| 6,494,804 B1 * | 12/2002 | Hunnicutt | ................. | F15C 5/00 137/625.6 |
| 6,540,203 B1 * | 4/2003 | Hunnicutt | ............. | B60T 8/3695 251/129.01 |
| 6,637,722 B2 * | 10/2003 | Hunnicutt | ............. | B60T 8/3695 251/26 |
| 6,694,998 B1 * | 2/2004 | Hunnicutt | ............. | B60T 8/3695 137/116.3 |
| 6,845,962 B1 * | 1/2005 | Barron | ..................... | B60T 8/366 137/596.16 |
| 7,210,502 B2 * | 5/2007 | Fuller | ................. | F04B 27/1804 137/596.16 |
| 8,011,388 B2 * | 9/2011 | Fuller | ................. | F16K 99/0001 137/625.65 |
| 8,136,616 B2 | 3/2012 | Padilla et al. | | |
| 8,662,468 B2 | 3/2014 | Hunnicutt | | |
| 9,140,613 B2 | 9/2015 | Arunasalam et al. | | |
| 2014/0374633 A1 | 12/2014 | Fuller et al. | | |

(Continued)

*Primary Examiner* — Craig Schneider
*Assistant Examiner* — Andrew J Rost
(74) *Attorney, Agent, or Firm* — MacMillan, Sobanski & Todd, LLC

(57) ABSTRACT

A microvalve includes a first plate having a surface defining an actuator cavity. A second plate has a surface that abuts the surface of the first plate and includes a displaceable member that is disposed within the actuator cavity for movement between a closed position, wherein the displaceable member prevents fluid communication through the microvalve, and an opened position, wherein the displaceable member does not prevent fluid communication through the microvalve. An actuator is connected to the displaceable member and has only one or two pairs of actuator ribs.

18 Claims, 5 Drawing Sheets

(56) References Cited

U.S. PATENT DOCUMENTS

2015/0047345 A1 2/2015 Eves et al.
2015/0352604 A1 12/2015 Arunasalam et al.

\* cited by examiner

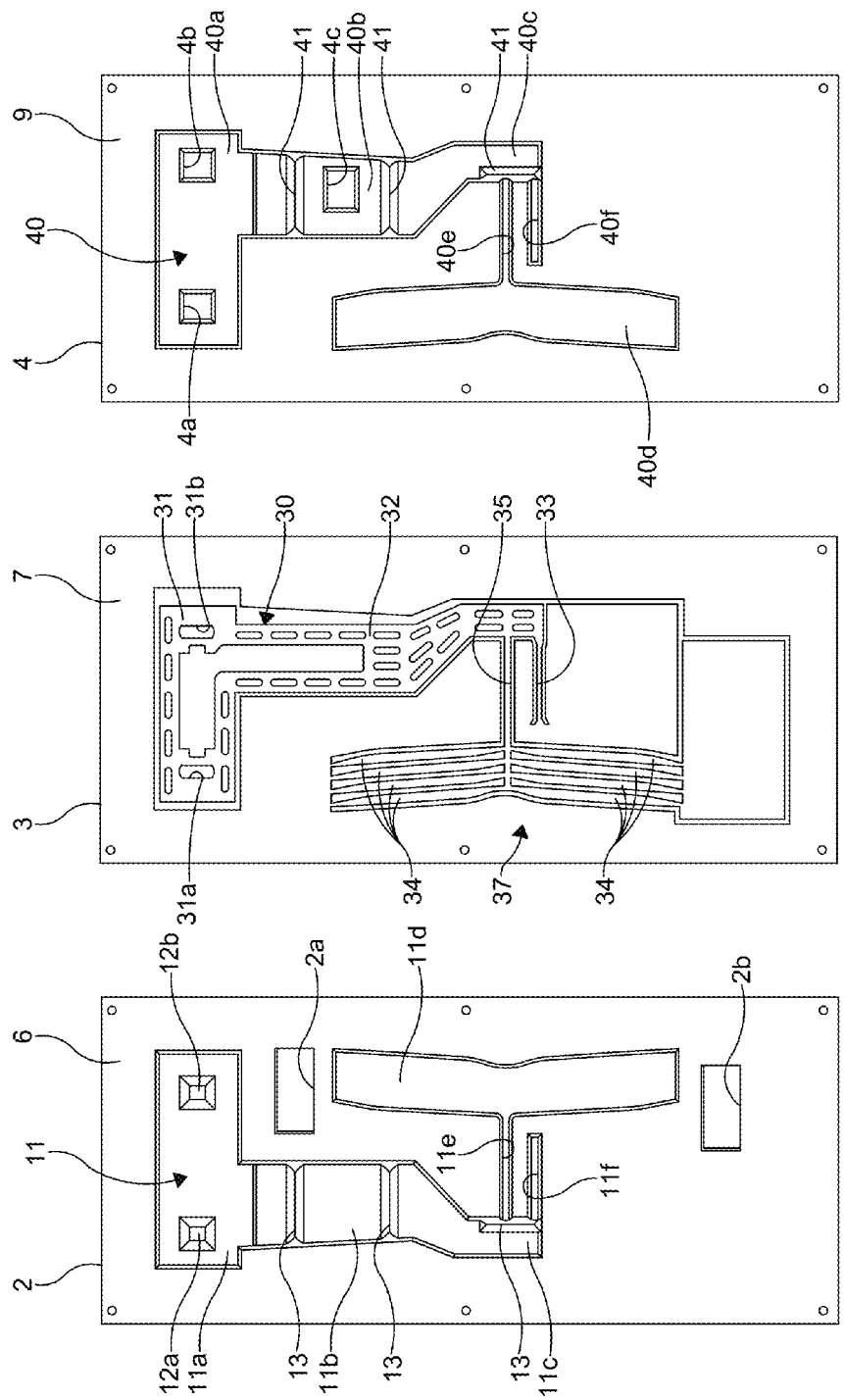

MICROVALVE HAVING IMPROVED ACTUATOR

CROSS REFERENCE TO RELATED APPLICATIONS

This application claims the benefit of U.S. Provisional Application No. 62/079,892 filed Nov. 14, 2014, the disclosure of which is incorporated herein by reference.

BACKGROUND OF THE INVENTION

This invention relates in general to microvalves for controlling the flow of fluid through a fluid circuit. In particular, this invention relates to an improved structure for such a microvalve that includes an improved actuator, the use of which reduces the power required to operate the microvalve.

Generally speaking, a micro-electro-mechanical system is a system that not only includes both electrical and mechanical components, but is additionally physically small, typically including features having sizes that are generally in the range of about ten micrometers or smaller. The term "micromachining" is commonly understood to relate to the production of three-dimensional structures and moving parts of such micro-electro-mechanical system devices. In the past, micro-electro-mechanical systems used modified integrated circuit (e.g., computer chip) fabrication techniques (such as chemical etching) and materials (such as silicon semiconductor material), which were micro-machined to provide these very small electrical and mechanical components. More recently, however, other micro-machining techniques and materials have become available.

As used herein, the term "micro-machined device" means a device including features having sizes in the micrometer range or smaller and, thus, is at least partially formed by micro-machining. As also used herein, the term "microvalve" means a valve including features having sizes in the micrometer range or smaller and, thus, is also at least partially formed by micro-machining. Lastly, as used herein, the term "microvalve device" means a micro-machined device that includes not only a microvalve, but further includes additional components. It should be noted that if components other than a microvalve are included in the microvalve device, these other components may be either micro-machined components or standard-sized (i.e., larger) components. Similarly, a micro-machined device may include both micro-machined components and standard-sized components.

A variety of microvalve structures are known in the art for controlling the flow of fluid through a fluid circuit. One well known microvalve structure includes a displaceable member that is supported within a closed internal cavity provided in a valve body for pivoting or other movement between a closed position and an opened position. When disposed in the closed position, the displaceable member substantially blocks a first fluid port that is otherwise in fluid communication with a second fluid port, thereby preventing fluid from flowing between the first and second fluid ports. When disposed in the opened condition, the displaceable member does not substantially block the first fluid port from fluid communication with the second fluid port, thereby permitting fluid to flow between the first and second fluid ports.

In a conventional thermally actuated microvalve structure, it has been found that in some instances it is desirable to reduce the power required to operate the thermally actuated microvalve. Thus, it would be desirable to provide an improved structure for a microvalve that facilitates a reduction of power required to operate the microvalve.

SUMMARY OF THE INVENTION

This invention relates to an improved microvalve that includes an improved actuator structure that provides desired actuator stiffness but reduces the power required to operate the microvalve. The microvalve includes a first plate having a surface defining an actuator cavity. A second plate has a surface that abuts the surface of the first plate and includes a displaceable member that is disposed within the actuator cavity for movement between a closed position, wherein the displaceable member prevents fluid communication through the microvalve, and an opened position, wherein the displaceable member does not prevent fluid communication through the microvalve. An actuator is connected to the displaceable member and has only one or two pairs of actuator ribs.

Various aspects of this invention will become apparent to those skilled in the art from the following detailed description of the preferred embodiment, when read in light of the accompanying drawings.

BRIEF DESCRIPTION OF THE DRAWINGS

FIG. 3 is a plan view of an inner surface of a conventional cover plate for a prior art microvalve.

FIG. 4 is a plan view of a conventional intermediate plate for a prior art microvalve.

FIG. 5 is a plan view of an inner surface of a conventional base plate for a prior art microvalve.

DETAILED DESCRIPTION OF THE PREFERRED EMBODIMENT

Figure 2:
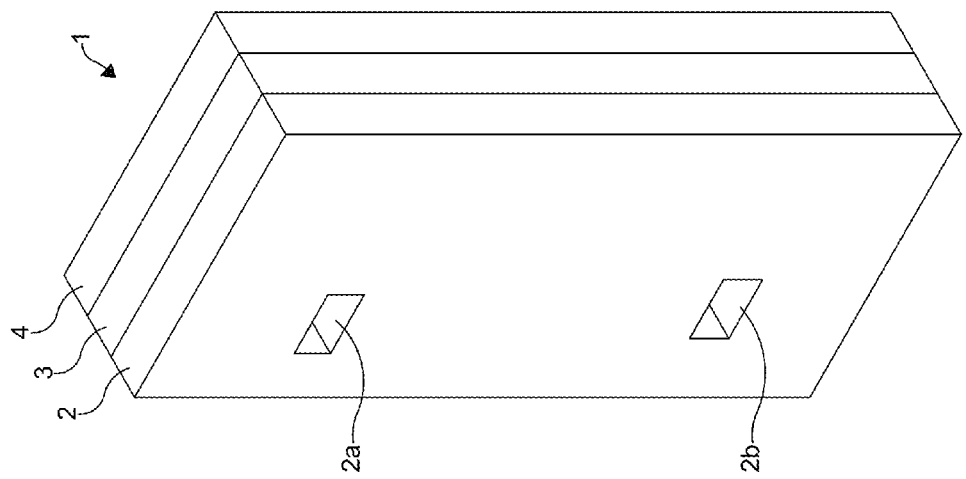
FIG. 2 is a perspective view of the basic structure of the microvalve illustrated in FIG. 1 shown assembled.
Figure 1:
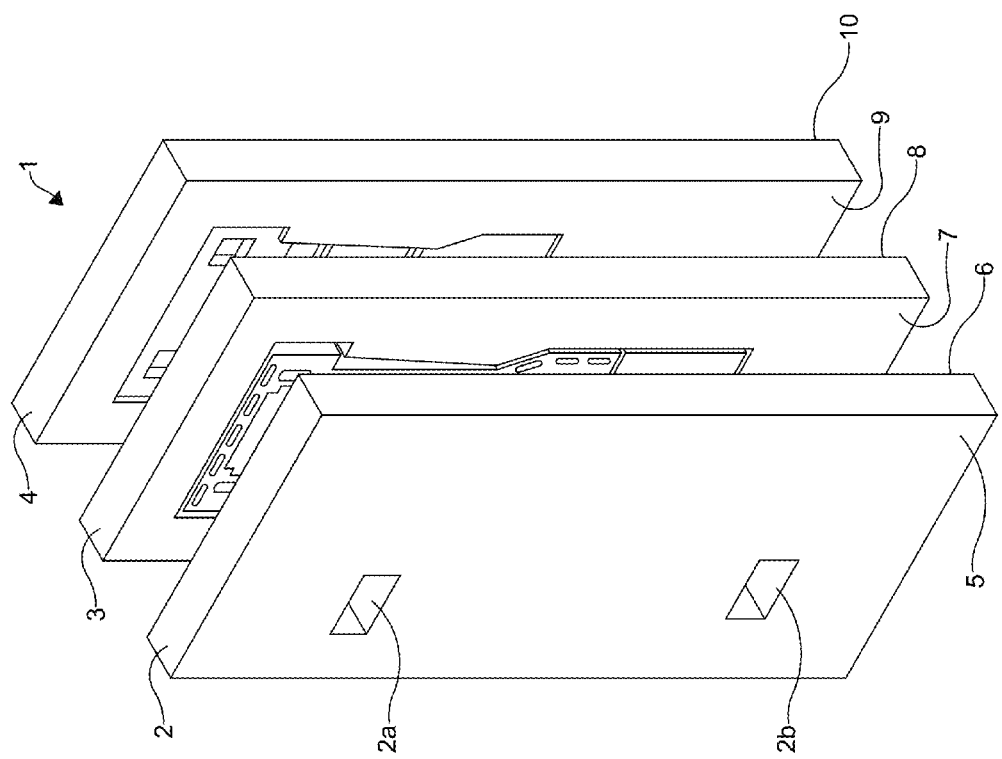
FIG. 1 is an exploded perspective view of a basic structure of a microvalve including a cover plate, an intermediate plate, and a base plate.

Referring now to the drawings, there is illustrated in FIGS. 1 and 2 a basic structure of a microvalve 1 that, to the extent shown, is representative of both a conventional structure for a microvalve and an improved structure for a microvalve in accordance with this invention. The illustrated microvalve 1 includes a cover plate 2, an intermediate plate 3, and a base plate 4. The cover plate 2 has an outer surface 5 and an inner surface 6. The cover plate 2 also has one or more openings (two of such openings 2a and 2b are shown in the illustrated embodiment) formed therethrough that, in a manner that is well known in the art, allow one or more electrically conductive wires (not shown) to pass therethrough. The intermediate plate 3 has a first surface 7 and a second surface 8. The base plate 4 has an inner surface 9 and an outer surface 10. The base plate 4 also has a one or more openings (three of such openings 4a, 4b, and 4c are shown in the illustrated embodiment) formed therethrough that, in a manner that is well known in the art, allow fluid to flow in to and out of the microvalve 1.

When the microvalve 1 is assembled as shown in FIG. 2, the inner surface 6 of the cover plate 2 engages the first surface 7 of the intermediate plate 3, and the inner surface 9 of the base plate 4 engages the second surface 8 of the intermediate plate 3. The cover plate 2, the intermediate plate 3, and the base plate 4 can be retained in this orientation in any desired manner. For example, portions of the cover plate 2 and/or the base plate 4 may be bonded to the intermediate plate 3, such as by fusion bonding, chemical bonding, or physically bonding (such as, for example, mechanical fasteners and/or adhesives). The cover plate 2, the intermediate plate 3, and the base plate 4 may be composed of any desired material or combination of materials. For example, the cover plate 2, the intermediate plate 3, and the base plate 4 may be composed of silicon and/or similar materials.

The structure of the inner surface 6 of a conventional cover plate 2 for a prior art microvalve is illustrated in detail in FIG. 3. As shown therein, the conventional cover plate 2 includes an actuator cavity, indicated generally at 11, that is provided on the inner surface 6 thereof. The illustrated actuator cavity 11 includes an upper actuator arm cavity portion 11a, a central actuator arm cavity portion 11b, a lower actuator arm cavity portion 11c, an actuator rib cavity portion 11d, an actuator spine cavity portion 11e, and an actuator hinge cavity portion 11f. The upper actuator arm cavity portion 11a has a pair of recessed areas 12a and 12b provided therein. The illustrated actuator cavity 11 also has one or more pressure equalization depressions 13 provided therein.

The structure of a conventional intermediate plate 3 for a prior art microvalve is illustrated in detail in FIG. 4. As shown therein, the conventional intermediate plate 3 includes a displaceable member, indicated generally at 60, that includes a sealing portion 61 having a pair of openings 61a and 61b formed therethrough. The sealing portion 61 is connected through an elongated arm portion 62 to a hinge portion 63 that is formed integrally with the conventional intermediate plate 3. The intermediate plate 3 also includes an actuator 37 including a plurality of actuator ribs 34 that is connected through a central spine 65 to the elongated arm portion 62 at a location that is intermediate of the sealing portion 61 and the hinge portion 63. As described below and illustrated in FIG. 8, conventional microvalves may include actuators having three actuator ribs 34.

As shown in FIG. 4, first ends of a first portion of the plurality of actuator ribs 34 (the upper ribs 34 when viewing FIG. 4) are flexibly joined at first ends thereof to a first non-moving part of the intermediate plate 3. Second ends of the first portion of the plurality of actuator ribs 34 are connected to the central spine 65. The first non-moving part of the intermediate plate 3 is electrically connected to a first bond pad (not shown) that is provided on the intermediate plate 3. Similarly, first ends of a second portion of the plurality of actuator ribs 34 (the lower ribs 34 when viewing FIG. 4) are flexibly joined at first ends thereof to a second non-moving part of the intermediate plate 3. Second ends of the second portion of the plurality of actuator ribs 34 are also connected to the central spine 65. The second non-moving part of the intermediate plate 3 is electrically connected to a second bond pad (not shown) that is provided on the intermediate plate 3. The second bond pad is electrically isolated from the first bond pad, other than through the plurality of actuator ribs 34.

In a manner that is well known in the art, electrical current may be passed from the first bond pad through the plurality of actuator ribs 34 to the second bond pad. Such electrical current causes thermal expansion of the plurality of actuator ribs 34, which causes axial movement of the central spine 65. As described above, the central spine 65 is connected to the elongated arm portion 62. Consequently, axial movement of the central spine 65 causes the elongated arm portion 62 (and, therefore, the sealing portion 61) of the displaceable member 60 to pivot about the hinge portion 63 or otherwise move relative to the rest of the intermediate plate 3 (such movement occurring within a plane defined by the rest of the intermediate plate 3). Thus, the illustrated displaceable member 60 functions as a conventional micro-electro-mechanical system thermal actuator.

The structure of the inner surface 9 of a conventional base plate 4 is illustrated in detail in FIG. 5. As shown therein, the conventional base plate 4 includes an actuator cavity, indicated generally at 40, that is provided on the inner surface 9 thereof. The illustrated actuator cavity 40 includes an upper actuator arm cavity portion 40a, a central actuator arm cavity portion 40b, a lower actuator arm cavity portion 40c, an actuator rib cavity portion 40d, an actuator spine cavity portion 40e, and a hinge cavity portion 40f. The illustrated actuator cavity 40 also has one or more pressure equalization depressions 41 provided therein.

Figure 6:
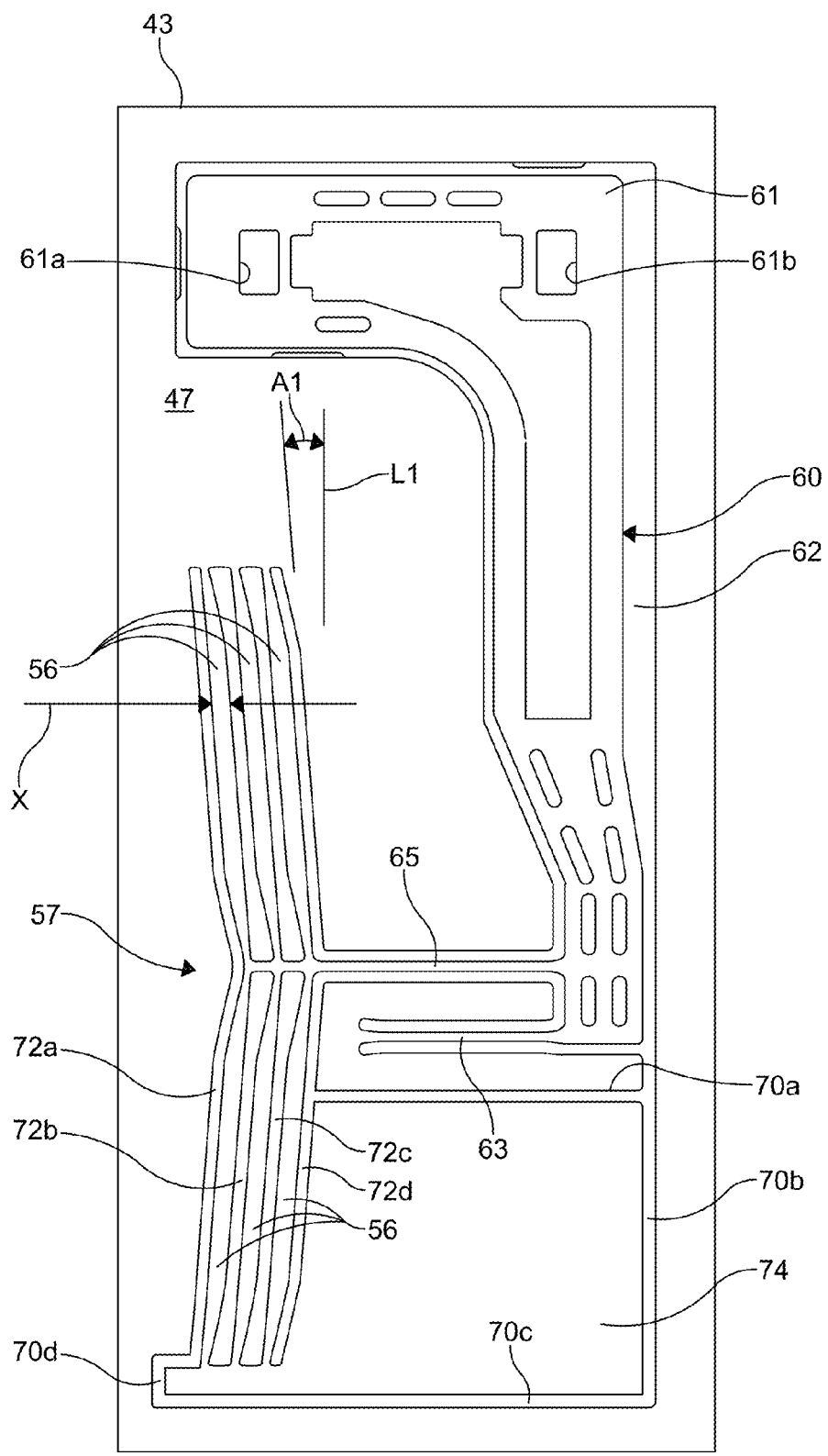
FIG. 6 is a plan view of a second embodiment of a conventional intermediate plate having an actuator comprising three pairs of actuator ribs.

FIG. 6 illustrates a second embodiment of an intermediate plate 43 for a conventional microvalve, such as the microvalve 1. The intermediate plate 43 is similar to the intermediate plate 3 and may be used with the cover plate 2 and the base plate 4, shown in FIGS. 2, 3, and 5. Like the intermediate plate 3, the intermediate plate 43 has a first surface 47 and a second surface (not shown). The intermediate plate 43 includes the displaceable member 60. The displaceable member 60 includes the sealing portion 61 having the pair of openings 61a and 61b formed therethrough. The sealing portion 61 is connected through the elongated arm portion 62 to the hinge portion 63 that is formed integrally with the conventional intermediate plate 43. The intermediate plate 43 differs from the intermediate plate 3 in that the actuator 57 of the intermediate plate 43 comprises three, rather than four, pairs of actuator ribs 56. As shown in FIG. 6, each actuator rib 56 has a width X within the range of about 120 µm to about 130 µm.

The three pairs of actuator ribs 56 are connected through the central spine 65 to the elongated arm portion 62 at a location that is intermediate of the sealing portion 61 and the hinge portion 63. Each rib 56 is disposed at an angle A1 measured from a line L1 parallel to a side edge of the intermediate plate 43. In the illustrated embodiment, the angle A1 is about 5 degrees.

Each pair of actuator ribs 56 is separated from an adjacent pair of ribs 56, or from the intermediate plate 43 by an elongated opening 72a, 72b, 72c, and 72d. The intermediate plate 43 also includes channels 70a, 70b, 70c, and 70d formed through the intermediate plate 43. The channels 70a, 70b, 70c, and 70d connect the elongated opening 72a to the elongated opening 72d.

The channels 70a, 70b, 70c, and 70d, and a longitudinally extending side edge one of the elongated opening 72d, also define a boundary of an isolation region 74 that physically separates the isolation region 74 from the rest of the intermediate plate 43, except through the pairs of actuator ribs 56.

As further shown in FIG. 6, first ends of a first portion of the plurality of actuator ribs 56 (the upper actuator ribs 56 when viewing FIG. 6) are flexibly joined at first ends thereof to a first non-moving part of the intermediate plate 43. Second ends of the first portion of the plurality of actuator ribs 56 are connected to the central spine 65. The first non-moving part of the intermediate plate 43 is electrically connected to a first bond pad (not shown) that is provided on the intermediate plate 43. Similarly, first ends of a second portion of the plurality of actuator ribs 56 (the lower actuator ribs 56 when viewing FIG. 6) are flexibly joined at first ends thereof to a second non-moving part of the intermediate plate 43. Second ends of the second portion of the plurality of actuator ribs 56 are also connected to the central spine 65. The second non-moving part of the intermediate plate 43 is electrically connected to a second bond pad (not shown) that is provided on the intermediate plate 43 within the isolation region 74. The second bond pad is thus electrically isolated from the first bond pad, other than through the plurality of actuator ribs 56.

Figure 7:
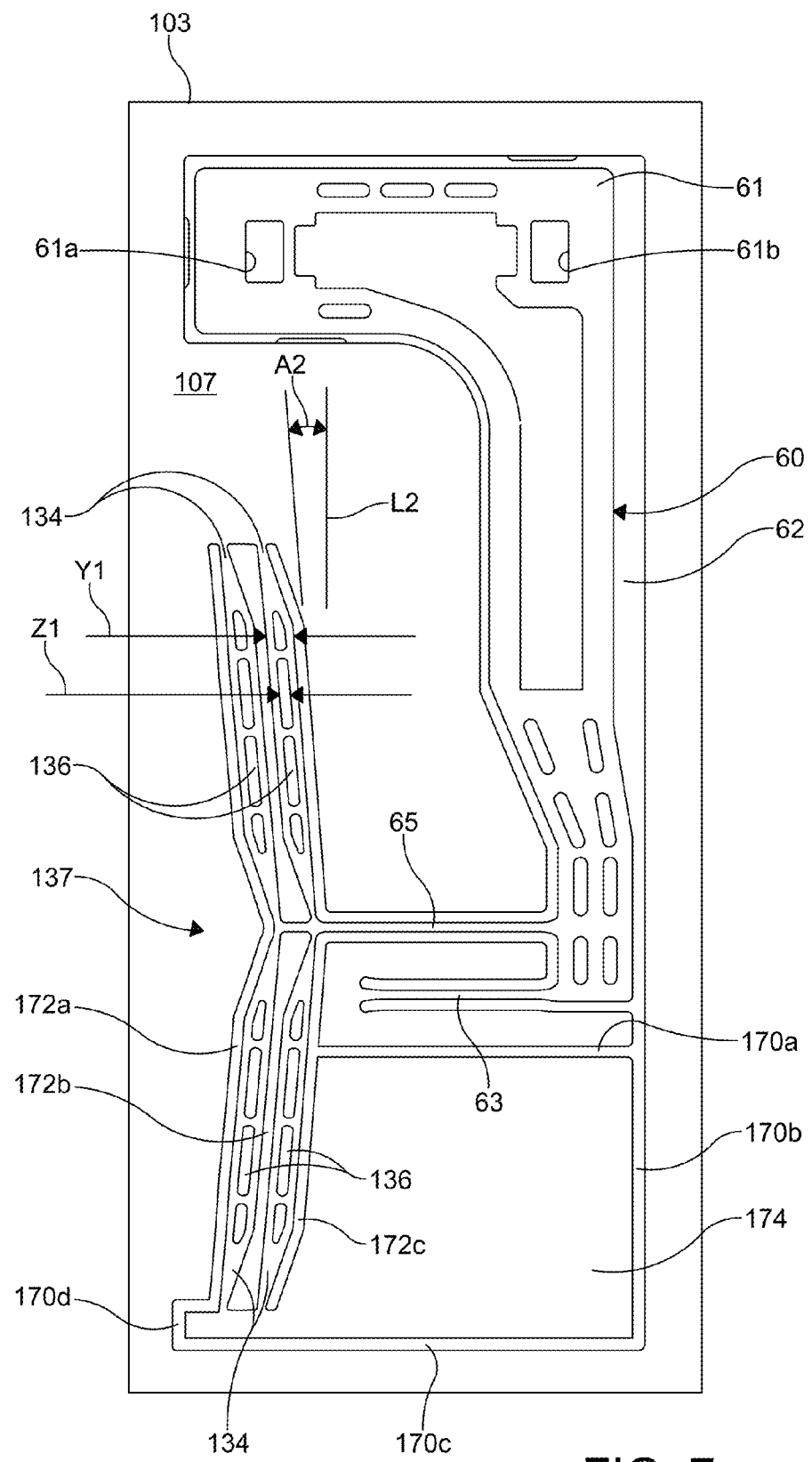
FIG. 7 is a plan view of a first embodiment of an improved intermediate plate having an improved actuator in accordance with this invention.

FIG. 7 illustrates an intermediate plate, indicated generally at 103, having an improved actuator 137, in accordance with a first embodiment of this invention. The intermediate plate 103 is similar to the intermediate plate 43 and may be used with the cover plate 2 and the base plate 4, shown in FIGS. 2, 3, and 5. Like the intermediate plate 43, the intermediate plate 103 has a first surface 107 and a second surface (not shown). The intermediate plate 103 includes the displaceable member 60 and the sealing portion 61 having the pair of openings 61a and 61b formed therethrough. The sealing portion 61 is connected through the elongated arm portion 62 to the hinge portion 63.

The intermediate plate 103 differs from the intermediate plate 43 in that it includes an improved actuator 137. The improved actuator 137 of the intermediate plate 103 comprises two pairs of actuator ribs 134, rather than three pairs of actuator ribs 56. Each of the actuator ribs 134 has a width Y1 that is wider than the width X of a similar rib 56 in the conventional actuator 57 according to the formula: width Y1=X+½X, where X=the width of the conventional actuator ribs 56. As also shown in FIG. 7, portions of each rib 134 have been removed to define apertures 136. The illustrated apertures 136 have a width Z1 of about ½X, where X=the width of the conventional actuator ribs 56. Alternatively, the apertures 136 may be other than as illustrated and have any desired size and shape required to achieve the desired actuator stiffness.

As shown in FIG. 6 and described above, the known actuator rib 56 has a width X within the range of about 120 μm to about 130 μm. Accordingly, the actuator ribs 134 may have a width Y1 within the range of about 184 μm to about 191 μm. Additionally, the apertures 136 formed in the actuator ribs 134 may have a width Z1 within the range of about 59 μm to about 66 μm.

The two pairs of actuator ribs 134 are connected through the central spine 65 to the elongated arm portion 62 at a location that is intermediate of the sealing portion 61 and the hinge portion 63. Each rib 134 is disposed at an angle A2 measured from a line L2 parallel to a side edge of the intermediate plate 103. In the illustrated embodiment, the angle A2 is about 5.25 degrees. Alternatively, the angle A2 may be within the range of about 4.25 degrees to about 6.25 degrees.

Each pair of actuator ribs 134 is separated from an adjacent rib pair or from the intermediate plate 103 by an elongated opening 172a, 172b, and 172c. The intermediate plate 103 also includes channels 170a, 170b, 170c, and 170d formed through the intermediate plate 103. The channels 170a, 170b, 170c, and 170d connect the elongated opening 172a to the elongated opening 172c.

The channels 170a, 170b, 170c, and 170d, and a longitudinally extending side edge of the elongated opening 172c, also define a boundary of an isolation region 174 that physically separates the isolation region 174 from the rest of the intermediate plate 103, except through the pairs of actuator ribs 134.

As further shown in FIG. 7, first ends of a first portion of the plurality of actuator ribs 134 (the upper actuator ribs 134 when viewing FIG. 7) are flexibly joined at first ends thereof to a first non-moving part of the intermediate plate 103. Second ends of the first portion of the plurality of actuator ribs 134 are connected to the central spine 65. The first non-moving part of the intermediate plate 103 is electrically connected to a first bond pad (not shown) that is provided on the intermediate plate 103. Similarly, first ends of a second portion of the plurality of actuator ribs 134 (the lower actuator ribs 134 when viewing FIG. 7) are flexibly joined at first ends thereof to a second non-moving part of the intermediate plate 103. Second ends of the second portion of the plurality of actuator ribs 134 are also connected to the central spine 65. The second non-moving part of the intermediate plate 103 is electrically connected to a second bond pad (not shown) that is provided on the intermediate plate 103 within the isolation region 174. The second bond pad is thus electrically isolated from the first bond pad, other than through the plurality of actuator ribs 134.

Figure 8:
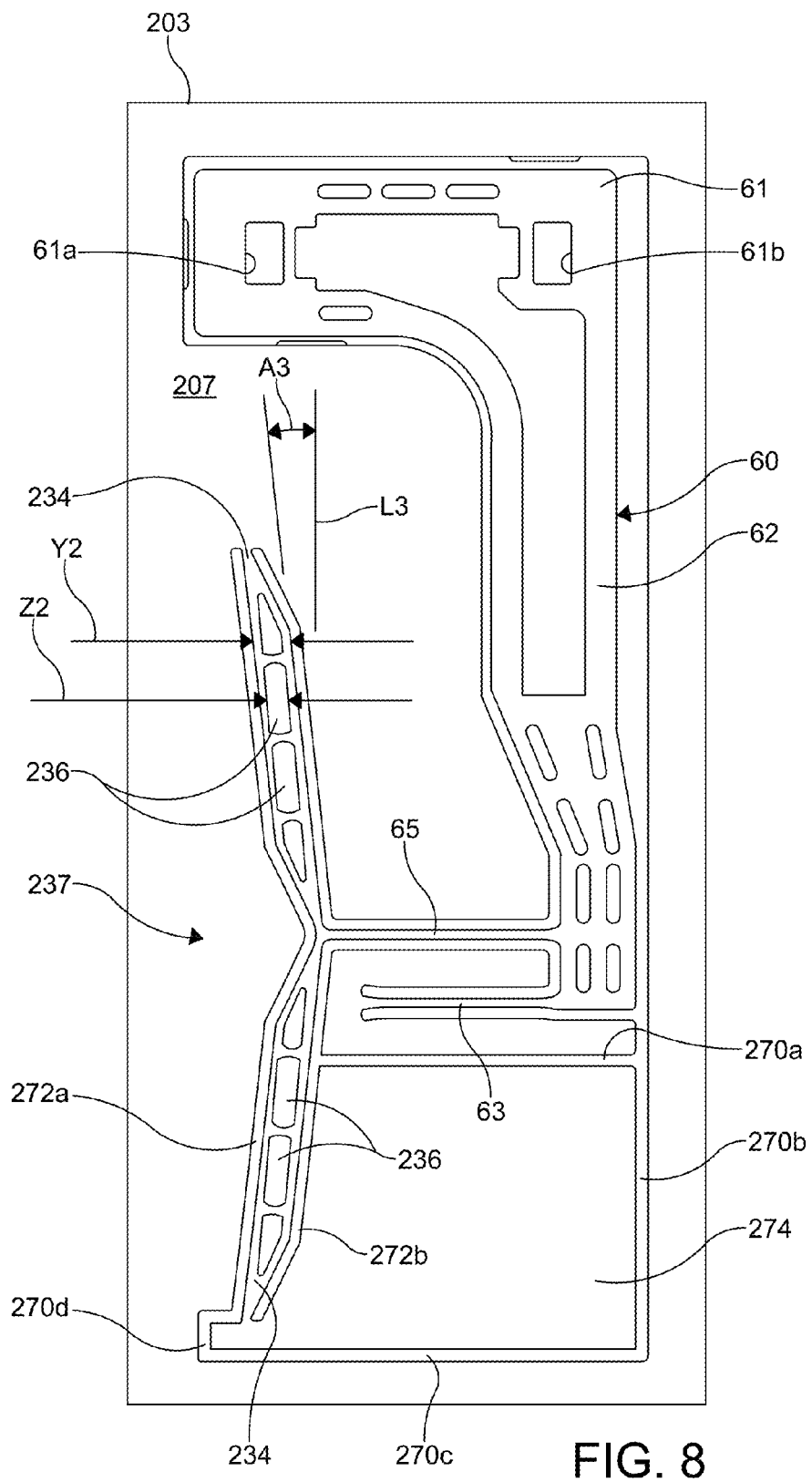
FIG. 8 is a plan view of a second embodiment of an improved intermediate plate having an improved actuator in accordance with this invention.

FIG. 8 illustrates an intermediate plate, indicated generally at 203, having an improved actuator 237, in accordance with a second embodiment of this invention. The intermediate plate 203 is similar to the intermediate plate 103 and may be used with the cover plate 2 and the base plate 4, shown in FIGS. 2, 3, and 5. Like the intermediate plate 103, the intermediate plate 203 has a first surface 207 and a second surface (not shown). The intermediate plate 203 includes the displaceable member 60 and the sealing portion 61 having the pair of openings 61a and 61b formed therethrough. The sealing portion 61 is connected through the elongated arm portion 62 to the hinge portion 63.

The intermediate plate 203 differs from the intermediate plate 103 in that the improved actuator 237 includes only one pair of actuator ribs 234. Each of the actuator ribs 234 has the width Y2, wherein Y2=2X. Portions of each rib 234 have been removed to define apertures 236. The illustrated apertures 236 have the width Z2, wherein Z2=X. Alternatively, the apertures 236 may be other than as illustrated, and have any desired size and shape required to achieve the desired actuator stiffness. In the actuator 237, the width Y2 of the ribs 134 in the one pair of ribs 234, and the size and shape of the apertures 236, may be determined based on a desired actuator stiffness and resistance level, and through routine experimentation.

As shown in FIG. 6 and described above, the known actuator rib 56 has a width X within the range of about 120 μm to about 130 μm. Accordingly, the actuator ribs 234 may have a width Y2 within the range of about 245 μm to about 255 μm. Additionally, the apertures 236 formed in the actuator ribs 234 may have a width Z2 within the range of about 120 μm to about 130 μm.

The pair of actuator ribs 234 is connected through the central spine 65 to the elongated arm portion 62 at a location that is intermediate of the sealing portion 61 and the hinge portion 63. Each rib 234 is disposed at an angle A3 measured from a line L3 parallel to a side edge of the intermediate plate 203. In the illustrated embodiment, the angle A3 is about 6 degrees. Alternatively, the angle A3 may be within the range of about 5 degrees to about 7 degrees.

The pair of actuator ribs 234 is separated from the intermediate plate 203 by elongated openings 272a and 272b. The intermediate plate 203 also includes channels 270a, 270b, 270c, and 270d formed through the intermediate plate 203. The channels 270a, 270b, 270c, and 270d connect the elongated opening 272a to the elongated opening 272b.

The channels 270a, 270b, 270c, and 270d, and a longitudinally extending side edge of the elongated opening 272b, also define a boundary of an isolation region 274 that physically separates the isolation region 274 from the rest of the intermediate plate 203, except through the pair of actuator ribs 234.

As further shown in FIG. 8, a first end of a first actuator rib 234 (the upper actuator rib 234 when viewing FIG. 8) is flexibly joined to a first non-moving part of the intermediate plate 203. A second end of the first actuator rib 234 is connected to the central spine 65. The first non-moving part of the intermediate plate 203 is electrically connected to a first bond pad (not shown) that is provided on the intermediate plate 203. Similarly, a first end of a second actuator rib 234 (the lower actuator rib 234 when viewing FIG. 8) is flexibly joined to a second non-moving part of the intermediate plate 203. A second end of the second actuator rib 234 is also connected to the central spine 65. The second non-moving part of the intermediate plate 203 is electrically connected to a second bond pad (not shown) that is provided on the intermediate plate 203 within the isolation region 274. The second bond pad is thus electrically isolated from the first bond pad, other than through the actuator ribs 234.

It may be desirable in some applications to reduce the power required to operate a thermally actuated microvalve, such as the microvalve 1 described above, while maintaining the stiffness or spring rate of the ribs. For example, during actuation of the actuator 57, i.e., when application of electrical current causes thermal expansion of the actuator ribs 56, the actuator ribs 56 behave as resistors in parallel. Therefore, it may be desirable to reduce the number of pairs of actuator ribs 56 to reduce the power required to operate the microvalve 1.

It will be understood however, that as a result of removing one or more pairs of actuator ribs 56 from the actuator 57, the stiffness of actuator 57; i.e., a spring rate or resistance to induced forces, of the actuator 57 may be undesirably and negatively affected, such that the stiffness of the actuator 57 is undesirably lowered relative to an actuator with 3 or 4 pairs of ribs. As a result, an actuator having only two pairs of the ribs 56 may become susceptible to unwanted movement due to fluid flow forces in the microvalve 1, or due to other induced forces, such as from friction induced by contamination or stiction.

It has been discovered that increasing the width of the actuator ribs 56 in an actuator having only two pairs of the ribs 56 (not shown, but similar to the actuator 57), raises the stiffness of the actuator, but lowers the electrical resistance of the actuator. For example, the actuator 57 requires about 10.8 watts of power to operate and has a spring rate of about 0.232 N/μm. A similar actuator with only two pairs of the ribs 56 requires only about 7.2 watts of power to operate. However, the actuator with only two pairs of the ribs 56 experiences a reduction in spring rate from a desired level of about 0.232 N/μm to about 0.178 N/μm. This undesirable reduction in the spring rate increases the susceptibility of the microvalve 1 to flow forces, which can negatively affect the hysteresis and linearity of the microvalve 1.

Advantageously, it has been further discovered that electrical resistance of the actuator may then be raised to a desired level by removing selected portions (embodied as the apertures 136 in FIG. 7) of a center of each rib 134, while retaining a desired stiffness of the actuator, such as a spring rate of about 0.232 N/μm.

It has been further discovered that when a load of 2 Newtons, which simulates the force experienced by a microvalve actuator during electrical actuation, is applied to the actuator 57 and the actuator 137, displacement of the ribs, 56 and 134 respectively, is substantially the same. Preferably, when subjected to a load of 2 Newtons, the actuator 137 will retain the desired spring rate of about 0.232 N/μm, while only requiring within the range of about 4.5 watts to about 7.0 watts of power to operate. Significantly, when subjected to a load of 2 Newtons, the illustrated actuator 137 retains the desired spring rate of about 0.232 N/μm, while advantageously only requiring about 6.6 watts of power to operate.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A microvalve comprising:
a first plate including a surface having an actuator cavity provided therein;
a second plate having a surface that abuts the surface of the first plate and includes a displaceable member that is disposed within the actuator cavity for movement between a closed position, wherein the displaceable member prevents fluid communication through the microvalve, and an opened position, wherein the displaceable member does not prevent fluid communication through the microvalve; and
an actuator connected to the displaceable member, the actuator having only one or two pairs of actuator ribs;
wherein each actuator rib includes an aperture formed therethrough.

2. The microvalve defined in claim 1, wherein the one or two pairs of actuator ribs are formed integrally with the second plate for moving the displaceable member between the closed and opened positions.

3. The microvalve defined in claim 1, wherein the actuator is connected to a source of electricity such that an electrical current is passed through the actuator ribs of the actuator, wherein the electrical current causes thermal expansion of the actuator ribs.

4. The microvalve defined in claim 3, wherein the aperture formed through each of the actuator ribs in the actuator is configured such that electrical resistance is increased relative to an identical actuator rib without the aperture.

5. The microvalve defined in claim 4, wherein the aperture is a plurality of apertures.

6. The microvalve defined in claim 4, wherein a width of each actuator rib is within the range of about 184 μm to about 191 μm.

7. The microvalve defined in claim 4, wherein a width of the aperture is within the range of about 59 μm to about 66 μm.

8. The microvalve defined in claim 1, wherein the actuator is configured such that the actuator requires within the range of about 4.5 watts to about 7.0 watts of power to operate.

9. A microvalve comprising:
a base plate including a surface, a recessed area provided within the surface, and first and second fluid ports provided within the recessed area;
a cover plate including a surface, a recessed area provided within the surface;

an intermediate plate having a first surface that abuts the surface of the base plate and a second surface that abuts the surface of the cover plate, the intermediate plate including a displaceable member is positioned to prevent fluid communication between the first and second fluid ports, and an opened position, wherein the displaceable member is positioned to permit fluid communication between the first and second fluid ports; and an actuator connected to the displaceable member, the actuator having only one or two pairs of actuator ribs; wherein each actuator rib includes an aperture formed therethrough.

10. The microvalve defined in claim 9, wherein the intermediate plate defines a plane, and wherein the displaceable member moves parallel to the plane when moved between the closed and opened positions.

11. The microvalve defined in claim 9, wherein the one or two pairs of actuator ribs are formed integrally with the intermediate plate for moving the displaceable member between the closed and opened positions.

12. The microvalve defined in claim 9, wherein the actuator is connected to a source of electricity such that an electrical current is passed through the actuator ribs of the actuator, wherein the electrical current causes thermal expansion of the actuator ribs.

13. The microvalve defined in claim 12, wherein the aperture formed through each of the actuator ribs in the actuator is configured such that electrical resistance is increased relative to an identical actuator rib without the aperture.

14. The microvalve defined in claim 13, wherein the aperture is a plurality of apertures.

15. The microvalve defined in claim 13, wherein a width of each actuator rib is within the range of about 184 μm to about 191 μm.

16. The microvalve defined in claim 13, wherein a width of the aperture is within the range of about 59 μm to about 66 μm.

17. The microvalve defined in claim 13, wherein the actuator ribs are connected through a central spine to an elongated arm portion of the displaceable member for moving the displaceable member between the closed and opened positions.

18. The microvalve defined in claim 9, wherein the actuator is configured such that the actuator requires within the range of about 4.5 watts to about 7.0 watts of power to operate.

* * * * *

UNITED STATES PATENT AND TRADEMARK OFFICE
CERTIFICATE OF CORRECTION

Page 1 of 1

PATENT NO. : 9,618,140 B2
APPLICATION NO. : 14/805500
DATED : April 11, 2017
INVENTOR(S) : Arunasalam et al.

It is certified that error appears in the above-identified patent and that said Letters Patent is hereby corrected as shown below:

On the Title Page

Related U.S. Application Data item (66), delete "Substitute" and insert -- Provisional --.

Signed and Sealed this
Thirtieth Day of May, 2017

Michelle K. Lee
*Director of the United States Patent and Trademark Office*